United States Patent
Fujihana et al.

(10) Patent No.: US 10,611,896 B2
(45) Date of Patent: Apr. 7, 2020

(54) ANTISTATIC COMPOSITION, MOLDED PRODUCT, ANTISTATIC PAINT, ANTISTATIC COATING, ANTISTATIC ADHESIVE, AND METHOD OF PRODUCING THE ANTISTATIC COMPOSITION

(71) Applicant: Sanko Chemical Industry Co., Ltd., Osaka (JP)

(72) Inventors: Noriaki Fujihana, Ashiya (JP); Yoshiharu Tatsukami, Toyonaka (JP)

(73) Assignee: SANKO CHEMICAL INDUSTRY CO., LTD., Osaka (JP)

( * ) Notice: Subject to any disclaimer, the term of this patent is extended or adjusted under 35 U.S.C. 154(b) by 176 days.

(21) Appl. No.: 15/787,925

(22) Filed: Oct. 19, 2017

(65) Prior Publication Data
US 2018/0273725 A1  Sep. 27, 2018

(30) Foreign Application Priority Data

Mar. 21, 2017  (JP) .................................. 2017-054477
May 1, 2017  (JP) .................................. 2017-091112

(51) Int. Cl.

| | | |
|---|---|---|
| C08K 5/435 | (2006.01) |
| C09D 175/04 | (2006.01) |
| C09J 11/06 | (2006.01) |
| C09J 175/04 | (2006.01) |
| C09D 133/12 | (2006.01) |
| C09J 109/02 | (2006.01) |
| C09D 109/02 | (2006.01) |
| C09D 123/12 | (2006.01) |
| C09J 123/12 | (2006.01) |
| C09J 155/02 | (2006.01) |
| C09D 155/02 | (2006.01) |
| C09J 133/12 | (2006.01) |
| C09D 7/63 | (2018.01) |
| C09D 5/00 | (2006.01) |
| C08G 18/08 | (2006.01) |
| C08G 18/44 | (2006.01) |
| C08L 55/02 | (2006.01) |
| C09D 133/06 | (2006.01) |
| C08K 5/00 | (2006.01) |
| C08K 5/42 | (2006.01) |

(52) U.S. Cl.
CPC .......... *C08K 5/435* (2013.01); *C08G 18/0866* (2013.01); *C08G 18/44* (2013.01); *C08L 55/02* (2013.01); *C09D 5/00* (2013.01); *C09D 7/63* (2018.01); *C09D 109/02* (2013.01); *C09D 123/12* (2013.01); *C09D 133/06* (2013.01); *C09D 133/12* (2013.01); *C09D 155/02* (2013.01); *C09D 175/04* (2013.01); *C09J 11/06* (2013.01); *C09J 109/02* (2013.01); *C09J 123/12* (2013.01); *C09J 133/12* (2013.01); *C09J 155/02* (2013.01); *C09J 175/04* (2013.01); *C08G 2170/80* (2013.01); *C08K 5/0075* (2013.01); *C08K 5/42* (2013.01); *C08K 2201/017* (2013.01)

(58) Field of Classification Search
CPC ..................................................... C08K 5/435
See application file for complete search history.

(56) References Cited

U.S. PATENT DOCUMENTS

| | | |
|---|---|---|
| 2003/0183810 A1 | 10/2003 | Fujihana et al. |
| 2004/0220301 A1 | 11/2004 | Hattori et al. |

FOREIGN PATENT DOCUMENTS

| | | |
|---|---|---|
| JP | 2006-137790 A | 6/2006 |
| KR | 10-2002-0091198 A | 12/2002 |
| KR | 10-2011-0043479 A | 4/2011 |
| TW | I319412 B | 1/2010 |

OTHER PUBLICATIONS

Machine translation of JP2006137790. (Year: 2006).*
Office Action dated Jan. 25, 2019, issued in counterpart CN Application No. 10-2017-0125843, with English translation (10 pages).

* cited by examiner

*Primary Examiner* — Wenwen Cai
(74) *Attorney, Agent, or Firm* — Westerman, Hattori, Daniels & Adrian, LLP

(57) ABSTRACT

An antistatic composition contains an ambient-temperature molten lithium salt dihydrate, and one of a polymerizable compound, a plastic resin, an elastomer and an adhesive resin in which the lithium salt dihydrate is dispersed. The lithium salt dihydrate contains two types of lithium salts with different molecular weights from each other. The two types of the lithium salts are selected from a group of lithium salts each containing an anion having a fluoro group and a sulfonyl group.

10 Claims, No Drawings

ANTISTATIC COMPOSITION, MOLDED PRODUCT, ANTISTATIC PAINT, ANTISTATIC COATING, ANTISTATIC ADHESIVE, AND METHOD OF PRODUCING THE ANTISTATIC COMPOSITION

TECHNICAL FIELD

The present disclosure relates to antistatic compositions with excellent antistatic properties, and more particularly, to an antistatic composition that does not contain organic solvents or generate outgas. The disclosure also relates to a method of producing such an antistatic composition. The disclosure further relates to a molded product, an antistatic paint, an antistatic coating, and an antistatic adhesive each containing such an antistatic composition.

BACKGROUND ART

Resins with antistatic properties have been achieved in recent years by applying an antistatic agent such as a surfactant to the surface of a resin molded product or by kneading an antistatic agent into a resin. However, the former method is not practical to achieve long-lasting antistatic resins because the antistatic properties greatly decrease with time. Meanwhile, in the latter method, the antistatic agent is incompatible with the resin and may bleed or bloom on the surface of the molded product, thereby reducing antistatic effects.

Furthermore, antistatic agents such as surfactants are humidity dependent. To be more specific, these agents lose their antistatic effects in low humidity environments and/or have slow-acting properties so that it takes at least one to three days until their antistatic effects appear after the resin is molded.

As the latter method, it has also been proposed to knead carbon black or carbon fiber into a resin. This approach achieves a resin composition with long-lasting antistatic properties. In this approach, however, molded products may not be transparent or may be available only in a limited selection of colors.

To solve these problems, the inventors have proposed an antistatic composition prepared by dissolving a salt with an anion having a fluoro group and a sulfonyl group in water, and then by dispersing the dissolved salt into a resin or an elastomer. This antistatic composition has the following features: good thermal stability and immediate effectivity; long-lasting antistatic properties; no bleeding, blooming, or migration stain of the antistatic agent; no humidity dependence; and the ability of maintaining its physical properties (see, e.g., PTL 1).

CITATION LIST

Patent Literature

PTL 1: Japanese Patent No. 4323414

SUMMARY OF DISCLOSURE

Technical Problem

The antistatic composition disclosed in PTL 1 has the following advantageous properties: being incombustible, nontoxic, inexpensive because the medium is water, and ecological because no organic solvents are used. However, using water as the medium causes the drying process to take a little more time when the composition is added or applied in a large amount. Furthermore, water remained in the composition may cause microfoams in the molded product.

To solve the above problems, an object of the present disclosure is to provide an antistatic composition that has as good drying characteristics as typical organic solvents by containing an incombustible antistatic agent.

Another object of the present disclosure is to provide an antistatic composition that has the following features: good thermal stability and immediate effectivity; long-lasting antistatic properties; no bleeding, blooming or migration stain of the antistatic agent; no humidity dependence; and the ability of maintaining its physical properties.

Still another object of the present disclosure is to provide a method of producing such an antistatic composition.

Still another object of the present disclosure is to provide a molded product, an antistatic paint, an antistatic coating, and an antistatic adhesive each of which contains such an antistatic composition.

Solution to Problem

An antistatic composition according to the present disclosure contains an ambient-temperature molten lithium salt dihydrate (which means a lithium salt di hydrate (molar ratio: lithium salt/water=1/2) melted at ambient temperature) dispersed in one of a polymerizable compound, a plastic resin, an elastomer, and an adhesive resin. This lithium salt dihydrate contains two types of lithium salts with different molecular weights from each other. The two types of lithium salts are selected from a group of lithium salts each containing an anion having a fluoro group and a sulfonyl group.

It has been found that when two types of lithium salts having different molecular weights, or in other words, different degrees of bulkiness are appropriately combined into a dihydrate, the dihydrate can be "a hydrate melted at ambient temperature" where all water molecules are isolated from each other, reacting with the lithium ions, so that the lithium salt dihydrate is in the liquid state at ambient temperature. In this ambient-temperature molten lithium salt dihydrate, the lithium salt is 100% ionized. This is because all water molecules are isolated from each other, reacting with the lithium ions, so that the lithium salt dihydrate is in the liquid state. These lithium ions that have been obtained by the 100% ionization of the lithium salt are uniformly dispersed in the above-mentioned polymerizable compound, plastic resin, elastomer, or adhesive resin.

It is preferable that the group of lithium salts each containing an anion having fluoro and sulfonyl groups should have a fluoro group that is bonded to a carbon atom. In this case, the ambient-temperature molten lithium salt dihydrate is unlikely to be hydrolyzed, thereby achieving a stable antistatic composition.

Specific examples of the lithium salts that are unlikely to be hydrolyzed and contain an anion having a fluoro group and a sulfonyl group include the following: $CF_3SO_3Li$ (2.3, 156); $C_4F_9SO_3Li$ (2.3, 306); $C_6F_5SO_3Li$ (1.1, 254); $C_8F_{17}SO_3Li$ (1.9, 506); $(CF_3SO_2)_2NLi$ (4.0, 287); $(C_2F_5SO_2)_2NLi$ (3.8, 387); $(C_4F_9SO_2)(CF_3SO_2)NLi$ (3.5, 437); $(C_8F_{17}SO_2)(CF_3SO_2)NLi$ (3.2, 637); $(CF_3CH_2OSO_2)_2NLi$ (3.0, 347); $(CF_3CF_2CH_2OSO_2)_2NLi$ (3.0, 447); $(HCF_2CF_2CH_2OSO_2)_2NLi$ (2.9, 411); $((CF_3)_2CHOSO_2)_2NLi$ (3.1, 483); $(CF_3SO_2)_3CLi$ (3.6, 418); and $(CF_3CH_2OSO_2)_3CLi$ (2.9, 508), where the two values in each parentheses indicate the electrical conductivity (mS/cm) and the molecular weight in this order.

In order to improve the antistatic properties of the composition, the lithium salts with an electrical conductivity (mS/cm) of 2.3 or more are preferable. Furthermore, the lithium salts with a molecular weight of less than 500 are preferable. When the molecular weight is 500 or more, the lithium salt dihydrate has a very low lithium ion content. In consideration of these facts, the preferable candidates for a combination of two types of lithium salts are as follows: (1) $CF_3SO_3Li$ (2.3, 156); (2) $C_4F_9SO_3Li$ (2.3, 306); (3) $(CF_3SO_2)_2NLi$ (4.0, 287); (4) $(C_2F_5SO_2)_2NLi$ (3.8, 387); (5) $(C_4F_9SO_2)(CF_3SO_2)NLi$ (3.5, 437); and (6) $(CF_3SO_2)_3CLi$ (3.6, 418).

Of the above candidates, preferable combinations are as follows: a combination of (1) and (3); a combination of (1) and (4); a combination of (1) and (5); a combination of (1) and (6); a combination of (2) and (3); a combination of (2) and (4); a combination of (3) and (4); a combination of (3) and (5); a combination of (4) and (5); and a combination of (4) and (6).

Of the above preferable combinations, further preferable combinations are those having molecular weights that are different from each other by at least 100. When this difference is at least 100, the singularity of the bulkiness difference appears. To be more specific, a phenomenon called "eutectic reaction" occurs efficiently where the mixture of these solids lowers their melting point. As a result, the obtained lithium salt dihydrate is liquid and stable at ambient temperature. This lithium salt dihydrate can be efficiently dispersed in the above-mentioned polymerizable compound, plastic resin, elastomer, or adhesive resin, exhibiting improved antistatic properties.

Summing up the above, the group of lithium salts each containing an anion having a fluoro group and a sulfonyl group includes the following as particularly preferable examples: lithium bis(trifluoromethanesulfonyl)imide shown in Formula (1); lithium bis(pentafluoroethanesulfonyl)imide shown in Formula (2); and lithium trifluoromethanesulfonate shown in Formula (3) below.

[Chem. 1]

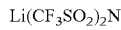

$$Li(CF_3SO_2)_2N \quad (1)$$

[Chem. 2]

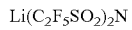

$$Li(C_2F_5SO_2)_2N \quad (2)$$

[Chem. 3]

$$LiCF_3SO_3 \quad (3)$$

The term "ambient-temperature molten" indicates that something is melted at ambient temperature because its melting point is at ambient temperature or below. In the ambient-temperature molten lithium salt dihydrate used as the antistatic agent, all water molecules are coordinated to the lithium ions, so that the lithium salt dihydrate is liquid, or in other words, is in the form of a hydrate melt. This hydrate melt can be dispersed with high affinity in a polymerizable compound, a plastic resin, an elastomer, or an adhesive resin, and does not generate outgas. The hydrate melt also has as good drying characteristics as compositions containing organic solvents.

The term "dispersed" used in this application indicates a state in which the above-mentioned ambient-temperature molten lithium salt dihydrate is scattered in the form of microdroplets or dissolved in the polymerizable compound, the plastic resin, the elastomer, or the adhesive resin.

The above-mentioned polymerizable compound indicates a compound containing a polymerizable functional group. Examples of the polymerizable compound include polymerizable monomers having an acryloyl group, a methacryloyl group, and a vinyl group. The polymerizable compound can be a monomer, an oligomer, or a compound with three or more active energy radiation curing functional group in a molecule.

Specific examples of the polymerizable compound include monofunctional, bifunctional, and polyfunctional compounds. Specific examples of the monofunctional compound include the following: methyl(meth)acrylate; ethyl (meth)acrylate; butyl(meth)acrylate; isobutyl(meth)acrylate; 2-ethylhexyl(meth)acrylate; phenoxyethyl(meth)acrylate; 2-ethoxyethyl(meth)acrylate; 2-ethoxyethoxyethyl(meth)acrylate; 2-hydroxyethyl(meth)acrylate; 2-hydroxypropyl (meth)acrylate; polycaprolactone-modified hydroxyethyl (meth)acrylate; dicyclopentenyloxyethyl(meth)acrylate; N-vinyl pyrrolidone; acryloylmorpholine; isobornyl(meth) acrylate; vinyl acetate; and styrene. Specific examples of the bifunctional compound include the following: neopentyl glycol di(meth)acrylate; 1,9-nonane diol di(meth)acrylate; 1,6-hexanediol di(meth)acrylate; 1,4-butanediol di(meth) acrylate; diethylene glycol di(meth)acrylate; triethylene glycol di(meth)acrylate; polyethylene glycol di(meth)acrylate; ethylene glycol di(meth)acrylate; dipropylene glycol di(meth)acrylate; and propylene glycol di(meth)acrylate. Specific examples of the polyfunctional compound include the following: trimethylolpropane tri(meth)acrylate; pentaerythritol tri(meth)acrylate; tri(meth)acrylate prepared by adding 3 mol of propylene oxide to trimethylolpropane and then subjecting it to esterification; tri(meth)acrylate prepared by adding 6 mol of ethylene oxide to trimethylpropane and then subjecting it to esterification; glycerin propoxy tri(meth) acrylate; dipentaerythritol hexa(meth)acrylate; and hexa(meth)acrylate prepared by adding caprolactone to dipentaerythritol and then subjecting it to esterification.

Specific examples of the active energy radiation curing (meth)acrylate compound include the following: 2-vinyloxyethyl (meth)acrylate; 3-vinyloxypropyl (meth)acrylate; 1-methyl-2-vinyloxy ethyl (meth)acrylate; 2-vinyloxypropyl (meth)acrylate; 4-vinyloxybutyl (meth)acrylate; 4-vinyloxycyclohexyl (meth)acrylate; 5-vinyloxypentyl (meth) acrylate; 6-vinyloxycyclohexyl (meth)acrylate; 4-vinyloxymethyl cyclohexyl (meth)acrylate; p-vinyloxy methyl phenyl methyl (meth)acrylate; 2-(vinyloxyethoxy) ethyl (meth)acrylate; 2-(vinyloxyethoxyethoxy)ethyl (meth) acrylate; and 2-(vinyloxyethoxyethoxyethoxy)ethyl (meth) acrylate.

The above-mentioned plastic resin can be one of the following: a polyolefin-based polymer; a polystyrene-based polymer; a polyamide-based polymer; a vinyl chloride-based polymer; a polyacetal-based polymer; a polyester-based polymer; a polyurethane-based polymer; a polycarbonate-based polymer; an acrylate/methacrylate-based polymer; a polyacrylonitrile-based polymer; a thermoplastic elastomer-based polymer; an unsaturated polyester-based polymer; an epoxy-based polymer; a phenol-based polymer; a diallyl-based polymer; a melamine-based polymer; a liquid crystal polyester-based polymer; a fluorine-based polymer; a polysulfone-based polymer; a polyphenylene ether-based polymer; a polyimide-based polymer; and a silicone-based polymer. Of these, those with a polar group are particularly preferable. Furthermore, the above-mentioned plastic resin can alternatively be an aqueous polyurethane resin in which water can be used in place of an organic solvent. Specific examples of the aqueous polyurethane resin include waterdispersible polyurethane resins and water-soluble polyurethane resins. Among them, aqueous, one liquid type, ether-modified polyurethane dispersions and self-emulsifying polyurethane dispersions are particularly preferable. The reason for this is that the ambient-temperature molten lithium salt dihydrate has a high affinity for these aqueous polyurethane resins and can be uniformly dispersed in them.

The above-mentioned elastomer can be one of the following: natural rubber; isoprene rubber; butadiene rubber; styrene-butadiene rubber; butyl rubber; ethylene propylene diene rubber; ethylene propylene rubber; chloroprene rubber; acrylonitrile butadiene rubber; chlorosulfonated polyethylene; epichlorohydrin rubber; chlorinated polyethylene; silicone rubber; fluororubber; and urethane rubber.

The above-mentioned adhesive resin can be an adhesive (meth)acrylic polymer. It is preferable to copolymerize two or more types of acrylic-based monomers having 4 to 12 carbon atoms. More preferable examples of the acrylic-based monomers are butyl(meth)acrylate and 2-ethylhexyl (meth)acrylate.

It is preferable that the content of the ambient-temperature molten lithium salt dihydrate should be 0.01 to 50 parts by mass, inclusive, per 100 parts by mass of the polymerizable compound, the plastic resin, the elastomer, or the adhesive resin.

The ambient-temperature molten lithium salt dihydrate preferably contains 0.7 mol of the lithium bis(trifluoromethanesulfonyl)imide, 2 mol of water, and 0.3 mol of either the lithium bis(pentafluoroethanesulfonyl)imide or the lithium trifluoromethanesulfonate.

It is preferable that the antistatic composition should have a water content of 0.3 wt % or less.

The method of producing an antistatic composition according to the present disclosure includes a first step of preparing, as a first component, an ambient-temperature molten lithium salt dihydrate containing two types of lithium salts with different molecular weights from each other. The two types of the lithium salts are selected from a group of lithium salts each containing an anion having a fluoro group and a sulfonyl group. The method further includes a second step of adding the first component to a second component and kneading them together. The second component is one of a polymerizable compound, a plastic resin, an elastomer, and an adhesive resin.

It is preferable that the method should further include a third step of adding an additional amount of the first component into the composition obtained in the second step, and either kneading or blending them together. The third step is performed to make the ambient-temperature molten lithium salt dihydrate (the first component) permeate into the composition.

The antistatic composition produced by this method has the following features: good thermal stability and immediate effectivity; long-lasting antistatic properties; no bleeding, blooming, or migration stain of the antistatic agent; no humidity dependence; and the ability of maintaining its physical properties.

The antistatic composition according to the present disclosure has good leveling properties and stability, or to be more specific, a surface resistivity of not more than the order of $10^{10}$ (Ω/sq) throughout its area even when it is formed into a film as thin as 3 μm. This composition can be applied on a heat resistant film, such as biaxially stretched polyethylene 2,6-naphthalate (PEN) used as electrical and electronic material in order to improve antistatic performance of the film.

The present disclosure is also directed to various molded products obtained by molding materials containing the antistatic composition. The antistatic composition according to the present disclosure can be used as a material for a film, a paint, a color resist composition for liquid crystal panels, etc., or can be applied to the surface of a molded product and cured as an antistatic coating. One specific example of the above-mentioned molded products is a color filter for liquid crystal panels.

The antistatic adhesive according to the present disclosure can be used as an adhesive for bonding various kinds of displays or optical members such as a polarizing plate to something else. The antistatic adhesive can also be used in surface-protective adhesive films because of its advantageous properties: high transparency and removability, hardly becoming colored with time, and a low level of peeling electrification.

The antistatic composition according to the present disclosure can be kneaded at a predetermined ratio with antistatic plastic when molded. For example, an antistatic composition prepared by dispersing the above-mentioned ambient-temperature molten lithium salt dihydrate into a thermoplastic polyurethane elastomer can be kneaded with polyethylene terephthalate (PET), which is a thermoplastic resin. This produces a polymer alloy that exhibits improved antistatic properties.

Advantageous Effects of the Disclosure

The antistatic composition according to the present disclosure contains an ambient-temperature molten lithium salt dihydrate as an antistatic agent. This lithium salt dihydrate can be dispersed uniformly with high affinity in a polymerizable compound, a plastic resin, an elastomer, or an adhesive resin, without generating outgas. The lithium salt dihydrate also has as good drying characteristics as compositions containing organic solvents. The uniform affinity ensures both high leveling properties and improved antistatic properties. Moreover, the composition is environmentally friendly because it contains no organic solvents as a medium for dissolving the antistatic agent.

DESCRIPTION OF EMBODIMENTS

As described above, one object of the present disclosure is to provide an antistatic composition having both as good drying characteristics as typical organic solvents and improved antistatic properties by containing an incombustible antistatic agent. This object has been achieved by dispersing an ambient-temperature molten lithium salt dihydrate into a polymerizable compound, a plastic resin, an elastomer, or adhesive resin. This lithium salt dihydrate contains two types of lithium salts with different molecular weights from each other. The two types of lithium salts are selected from a group of lithium salts each containing an anion having a fluoro group and a sulfonyl group.

In the ambient-temperature molten lithium salt dihydrate used as the antistatic agent, all water molecules are coordinated to the lithium ions, so that the lithium salt dihydrate is liquid. In the antistatic composition according to the present disclosure, this lithium salt dihydrate is dispersed in a polymerizable compound, a plastic resin, an elastomer, or an adhesive resin. In this lithium salt dihydrate, all water molecules are coordinated to the lithium ions, and therefore do not have the properties of normal water any more. This lithium salt dihydrate is dispersed with high affinity in a polymerizable compound, a plastic resin, an elastomer, or an adhesive resin, and does not generate outgas. The lithium salt dihydrate also has as good drying characteristics as compositions containing organic solvents. When the antistatic composition is cured into a film, the film causes no bleeding, blooming, or migration stain of the antistatic agent, and has high transparent and improved antistatic properties.

The ambient-temperature molten lithium salt dihydrate that is preferably used as the antistatic agent can be obtained by mixing lithium bis(trifluoromethanesulfonyl)imide (LiTFSI) and lithium bis(pentafluoroethanesulfonyl)imide (LiBETI) in an appropriate ratio. A single type of lithium salt alone does not form a hydrate; therefore, two types of lithium salts are mixed in a certain ratio to form "a hydrate melted at ambient temperature" in which all water molecules are isolated from each other, reacting with the lithium ions, so that the lithium salt dihydrate is in the liquid state.

In normal aqueous solutions, water molecules are hydrogen-bonded to each other. Meanwhile, in the ambient-temperature molten lithium salt dihydrate, the water molecules are isolated from each other, exhibiting a completely different arrangement. This lithium salt dihydrate has a viscosity of about 80 m·Pa·s (20° C.) or less.

Components obtained in the following Examples and Comparative Examples were measured for their surface resistivities and volume resistivities according to JIS K 9611 under applied voltages of 100 V and 500 V using a USR probe, namely Hiresta UP® manufactured by Mitsubishi Chemical Corporation. Examples 1 to 5 will now be described as follows.

EXAMPLE

Examples 1 to 5

First, 0.7 mol (200.9 g) of lithium bis(trifluoromethanesulfonyl)imide ($Li(CF_3SO_2)_2N$), 0.3 mol (116.1 g) of lithium bis(pentafluoroethanesulfonyl)imide ($Li(C_2F_5SO_2)_2N$), and 2 mol (36 g) of water were mixed to obtain 353.0 g of lithium salt dihydrate ($[Li(CF_3SO_2)_2N]_{0.7}\cdot[Li(C_2F_5SO_2)_2N]_{0.3}\cdot 2H_2O$), which was stable and liquid at ambient temperature. Next, as shown in Table 1, predetermined parts by mass of the lithium salt dihydrate (hereinafter, EU1) was added to 100 parts by mass of resin or elastomer so as to obtain a composition. Next, the composition was kneaded by a kneader, which was set at the processing temperature of the resins or the elastomer, and was then injection-molded into a test specimen with a width of 6 cm×a length of 6 cm×a thickness of 0.3 cm to be used in Examples 1 to 5.

Comparative Examples 1 to 5

A test specimen to be used in Comparative Examples 1 to 5 was prepared in the same manner as in Examples 1 to 5, respectively, except that the lithium salt dihydrate was not added.

Experiment 1

The test specimen of Examples 1 to 5 and that of Comparative Examples 1 to 5 were measured for their surface resistivities ($\Omega$/sq) according to JIS K 9611. The measurement results are shown in Table 1. These test specimens were left for seven days in an atmosphere of a temperature of 40° C. and a relative humidity of 90%. The test specimens left for seven days were visually checked for bleeding. The evaluation results are shown in Table 1. The test specimen of Example 1 was measured for its change in weight before and after a drying process (four hours at 85° C.). After the drying process, it had a water content of not more than 0.1 wt %.

TABLE 1

| composition | resin/elastomer | lithium salt dihydrate (parts by mass) | surface resistivity ($\Omega$/sq) | bleeding |
|---|---|---|---|---|
| Example 1 | ABS | EU1 5 | $4 \times 10^9$ | no bleeding |
| Example 2 | PP | EU1 2 | $9 \times 10^{10}$ | no bleeding |
| Example 3 | TPU | EU1 0.5 | $1 \times 10^6$ | no bleeding |
| Example 4 | NBR | EU1 2 | $2 \times 10^6$ | no bleeding |
| Example 5 | PMMA | EU1 1 | $2 \times 10^{11}$ | no bleeding |
| Comparative Example 1 | ABS | — | $9 \times 10^{12}$ | — |
| Comparative Example 2 | PP | — | $6 \times 10^{12}$ | — |
| Comparative Example 3 | TPU | — | $8 \times 10^{13}$ | — |
| Comparative Example 4 | NBR | — | $5 \times 10^{11}$ | — |
| Comparative Example 5 | PMMA | — | $2 \times 10^{12}$ | — |

In Table 1, the following abbreviations are used: ABS for acrylonitrile-butadiene-styrene copolymer resin, PP for polypropylene resin, TPU for thermoplastic polyurethane elastomer, NBR for butadiene-acrylonitrile copolymer resin, and PMMA for polymethyl methacrylate resin.

Example 6

First, 355.5 g of lithium salt dihydrate (EU2), which was stable at ambient temperature was prepared in the same manner as in Example 1 by mixing 0.7 mol (270.9 g) of lithium bis(pentafluoroethanesulfonyl)imide ($Li(C_2F_5SO_2)_2N$), 0.3 mol (46.8 g) of lithium trifluoromethanesulfonate ($LiCF_3SO_3$), and 2.1 mol (37.8 g) of water. Next, 10 parts by mass of ethylene oxide-propylene oxide-allyl glycidyl ether copolymer, and 5 parts by mass of the lithium salt dihydrate (EU2) were added to 100 parts by mass of acrylonitrile butadiene rubber (NBR). The mixture was kneaded by a kneader and pressed into a test specimen with a width of 6 cm×a length of 6 cm×a thickness of 0.3 cm by a press. The test specimen had a surface resistivity of $1 \times 10^6$ $\Omega$/sq. The above mentioned ethylene oxide-propylene oxide-allyl glycidyl ether copolymer is namely Zeospan® 6030 manufactured by Zeon Corporation, and the NBR is namely N520 manufactured by JSR Corporation.

Example 7

A pellet mixture of 10 parts by mass of antistatic TPU composition (in pellet form) used in Example 3 shown in Table 1 and 90 parts by mass of polyethylene terephthalate (in pellet form), namely TRN-8580FM manufactured by Teijin Limited, was kneaded by an extruder into pellets again. Next, the pellets were injection molded at a processing temperature of 240° C. into a 2 mm-thick sheet. This test specimen had a volume resistivity of $4 \times 10^9$ $\Omega$·cm.

Example 8

First, 5 parts by mass of the lithium salt dihydrate (EU1) of Example 1 was added to 100 parts by mass of an acrylic-based copolymer (weight-average molecular weight: 600,000 and Tg: −68° C.) that had been prepared by copolymerizing n-butyl acrylate, 2-ethylhexyl acrylate, and acrylic acid. The mixture was stirred for 15 minutes to obtain an acrylic-based adhesive composition. Next, the mixture was applied to release paper and dried to obtain a 10 µm-thick adhesive sheet. The adhesive layer of this sheet was adhesive processed into an iodine-based polarizing plate, and then was sandwiched and bonded between two triacetylcellulose (TAC) films. This film with the three-layer structure had a volume resistivity of $1 \times 10^9$ Ω·cm.

Example 9

First, 10 parts by mass of the lithium salt dihydrate (EU1) obtained in Example 1, 90 parts by mass of polyethylene glycol dimethacrylate (nine oxyethylene units), and 98 parts by mass of polyethylene glycol dimethacrylate (six oxyethylene units) were mixed together. Next, 4 parts by mass of benzophenone and 4 parts by mass of methyl phenyl glyoxylate were added as light polymerization initiators to the mixture to obtain a liquid composition. This composition was sprayed onto an injection-molded plate (50 mm×50 mm×3 mm) made of polycarbonate resin, and dried at 60° C. for 3 minutes by a hot air dryer. This plate was exposed to ultraviolet light until the integrated amount of light was 1500 mJ/cm$^2$ (for ten seconds) in the air using a high-pressure mercury lamp. As a result, the obtained polycarbonate resin plate had a cured film with a thickness of 7 µm and a surface resistivity of $2 \times 10^8$ Ω/sq.

Example 10

First, 0.7 mol (200.9 g) of lithium bis(trifluoromethanesulfonyl)imide (Li(CF$_3$SO$_2$)$_2$N), 0.3 mol (46.8 g) of lithium trifluoromethanesulfonate (LiCF$_3$SO$_3$), and 2 mol (36 g) of water were mixed to obtain 283.7 g of lithium salt dihydrate (EU3), which was stable and liquid at ambient temperature. Next, 2.4 parts by mass of the lithium salt dihydrate (EU3) was added to 100 parts by mass of thermoplastic polyurethane (TPU) having a surface resistivity of $4.0 \times 10^{10}$ Ω/sq so as to obtain a thermoplastic polyurethane composition. This composition was kneaded at 150° C. for one minute using a heating roller, and hot-pressed at 180° C. for seven minutes using a press so as to obtain a test specimen with a width of 6 cm×a length of 6 cm×a thickness of 2 mm. This test specimen had a surface resistivity of $1.3 \times 10^7$ Ω/sq.

Comparative Example 6

First, 0.7 mol (200.9 g) of lithium bis(trifluoromethanesulfonyl)imide (Li(CF$_3$SO$_2$)$_2$N) and 0.3 mol (46.8 g) of lithium trifluoromethanesulfonate (LiCF$_3$SO$_3$) were mixed to obtain a lithium salt mixture (in powder form). Next, 7.0 parts by mass of the lithium salt mixture (in powder form) was added to 100 parts by mass of thermoplastic polyurethane having a surface resistivity of $4.0 \times 10^{10}$ Ω/sq so as to obtain a thermoplastic polyurethane composition. This composition was kneaded at 150° C. for one minute using a heating roller, and hot-pressed at 180° C. for seven minutes using a press so as to obtain a test specimen with a width of 6 cm×a length of 6 cm×a thickness of 2 mm. This test specimen had a surface resistivity of $6.0 \times 10^7$ Ω/sq.

A comparison between Example 10 and Comparative Example 6 reveals that the ambient-temperature molten lithium salt dihydrate not only has the great advantage of being easier to handle than the lithium salt in powder form, but also has about 3.5 times as high antistatic effects to the TPU as the lithium salt in powder form. In short, when the lithium salt in powder form was added to the TPU, only about 30% in amount of the added lithium salt was ionized in the TPU resin. This means that the TPU resin contains about 70% of unionized lithium salt (in powder form). In this TPU, the unionized lithium salt in powder form is gradually ionized while being kneaded, thereby exhibiting antistatic properties. Meanwhile, in the ambient-temperature molten lithium salt dihydrate, the lithium salt is 100% ionized. This is because all water molecules are isolated from each other, reacting with the lithium ions, so that the lithium salt dihydrate is in the liquid state. These lithium ions are dispersed in the TPU, thereby immediately exhibiting antistatic properties. This difference appears as the difference of the above-mentioned about 3.5 times of antistatic effects.

Example 11

The lithium salt dihydrate (EU3) obtained in Example 10 was added to an aqueous, one liquid type, ether-modified polyurethane dispersion such that the solid content of the EU3 was 0.3% by mass in the polyurethane. The mixture was stirred for five minutes to obtain an aqueous polyurethane dispersion (PUD) composition. This composition was applied using a test coater to each of a corona-treated polyethylene terephthalate (PET) film and a 100 µm-thick polycarbonate (PC) film such that the coated film could be 20 µm thick when dried. Next, these films were heated in an oven at 80° C. for one hour to obtain transparent PET and PC films coated with a polyurethane thin film. The PET and PC films had a surface resistivity of $2.5 \times 10^7$ Ω/sq and $3.0 \times 10^7$ Ω/sq, respectively. The coated films were evaluated for adhesion by cross-cut adhesion test using Sellotape®, and it has been found that both had excellent adhesion of 90/100 or more. The above-mentioned an aqueous, one liquid type, ether-modified polyurethane dispersion is namely Super Flex® 110 manufactured by DKS Co., Ltd, and the corona-treated PET film is namely T100-38 with a thickness of 35 µm manufactured by Mitsubishi Chemical Corporation.

Example 12

The lithium salt dihydrate (EU3) obtained in Example 10 was added to 100 g (non-volatile content: 35% by mass) of a self-emulsifying polyurethane dispersion (PUD) made of polycarbonate diol such that the solid content of the EU3 was 0.75% by mass in the PUD. The mixture was stirred for five minutes to obtain an aqueous PUD composition. This composition was applied to the surface of the same PET film as used in Example 11 in the same manner as in Example 11. Next, the mixture was heated in an oven at 100° C. for 30 minutes to obtain a highly transparent PET film coated with a 10 µm-thick polyurethane thin film. This film had a surface resistivity of $1.0 \times 10^7$ Ω/sq. The coated film was evaluated for adhesion by cross-cut adhesion test using Sellotape, and it has been found that it had excellent adhesion of 100/100.

The lithium salts used in Examples are lithium bis(trifluoromethanesulfonyl)imide, lithium bis(pentafluoroethanesulfonyl)imide, and lithium trifluoromethanesulfonate; however, the antistatic agent used in the present disclosure is not limited to them. The antistatic agent used in the present disclosure can be two or more types of lithium salts that each contain an anion having a fluoro group and a sulfonyl group, and are formed into a hydrate melt at ambient temperature by making use of the phenomenon called "eutectic reaction" where the mixture of these solids lower their melting point.

Examples are merely exemplary in every aspect, and the present disclosure should not be limited to them. The present disclosure includes the scope of the claims and any modifications within the scope of the claims and their equivalents.

INDUSTRIAL APPLICABILITY

The present disclosure provides an antistatic composition with the following features: no generation of outgas; good thermal stability and immediate effectivity; long-lasting antistatic properties; no bleeding, blooming, or migration stain of the antistatic agent; no humidity dependence; and the ability of maintaining its physical properties.

What is claimed is:

1. An antistatic composition comprising:
   an ambient-temperature molten lithium salt dihydrate; and
   a component selected from the group consisting of a polymerizable compound, a plastic resin, an elastomer, and an adhesive resin, in which the ambient-temperature molten lithium salt dihydrate is dispersed;
   wherein the ambient-temperature molten lithium salt dihydrate comprises:
      0.7 mol of the lithium bis(trifluoromethanesulfonyl)imide;
      0.3 mol of the lithium bis(pentafluoroethanesulfonyl)imide; and
      2 mol of water, or
      0.7 mol of the lithium bis(trifluoromethanesulfonyl)imide;
      0.3 mol of the lithium trifluoromethanesulfonate; and
      2 mol of the water.

2. The antistatic composition according to claim 1, wherein a content of the ambient-temperature molten lithium salt dihydrate is 0.01 to 50 parts by mass per 100 parts by mass of the component selected from the group consisting of the polymerizable compound, the plastic resin, the elastomer, and the adhesive resin.

3. The antistatic composition according to claim 1 having a water content of not more than 0.3 wt %.

4. The antistatic composition according to claim 1, wherein the plastic resin comprises an aqueous polyurethane resin.

5. A method of producing an antistatic composition, comprising:
   a first step of preparing, as a first component, an ambient-temperature molten lithium salt dihydrate; and
   a second step of adding the first component to a second component, and kneading the first component and the second component together, the second component being one selected from the group consisting of a polymerizable compound, a plastic resin, an elastomer, and an adhesive resin;
   wherein the ambient-temperature molten lithium salt dihydrate comprises:
      0.7 mol of the lithium bis(trifluoromethanesulfonyl)imide;
      0.3 mol of the lithium bis(pentafluoroethanesulfonyl)imide; and
      2 mol of water, or
      0.7 mol of the lithium bis(trifluoromethanesulfonyl)imide;
      0.3 mol of the lithium trifluoromethanesulfonate; and
      2 mol of the water.

6. The method according to claim 5, further comprising a third step of adding an additional amount of the first component into the composition obtained in the second step and either kneading or blending the additional amount of the first component with the composition obtained in the second step.

7. A molded product obtained by molding the antistatic composition according to claim 1.

8. An antistatic paint comprising the antistatic composition according to claim 1.

9. An antistatic coating comprising the antistatic composition according to claim 1.

10. An antistatic adhesive comprising the antistatic composition according to claim 1.

* * * * *